United States Patent
Spatz (10) Patent No.: US 10,534,828 B2
(45) Date of Patent: Jan. 14, 2020

(54) SYSTEM AND METHOD FOR COLLECTION AND STORAGE OF COMMUNITY INFORMATION

(71) Applicant: Kiddy Up LLC, Alexandria, VA (US)

(72) Inventor: Jennifer Spatz, Alexandria, VA (US)

(73) Assignee: Kiddy Up LLC, Alexandria, VA (US)

(*) Notice: Subject to any disclaimer, the term of this patent is extended or adjusted under 35 U.S.C. 154(b) by 180 days.

(21) Appl. No.: 15/670,032

(22) Filed: Aug. 7, 2017

(65) Prior Publication Data

US 2018/0046723 A1   Feb. 15, 2018

Related U.S. Application Data

(60) Provisional application No. 62/374,134, filed on Aug. 12, 2016.

(51) Int. Cl.
*G06F 17/00* (2019.01)
*G06F 16/9535* (2019.01)
*G06F 16/957* (2019.01)
*G06F 3/0482* (2013.01)

(52) U.S. Cl.
CPC ...... *G06F 16/9535* (2019.01); *G06F 16/9577* (2019.01); *G06F 3/0482* (2013.01)

(58) Field of Classification Search
None
See application file for complete search history.

(56) References Cited

U.S. PATENT DOCUMENTS

| | | | |
|---|---|---|---|
| 6,311,194 B1 | 10/2001 | Sheth et al. | |
| 6,360,205 B1 | 3/2002 | Iyengar et al. | |
| 6,453,347 B1 | 9/2002 | Revashetti et al. | |
| 6,611,842 B1 | 8/2003 | Brown | |
| 6,760,721 B1* | 7/2004 | Chasen | G06F 16/48 |
| 7,599,847 B2* | 10/2009 | Block | G06Q 20/206 |
| | | | 705/5 |
| 7,774,331 B2* | 8/2010 | Barth | G06Q 10/02 |
| | | | 707/706 |
| 8,700,568 B2* | 4/2014 | Betz | G06F 16/2365 |
| | | | 707/612 |
| 8,727,781 B2 | 5/2014 | Dohring et al. | |
| 9,009,136 B2* | 4/2015 | Abajian | G06F 16/9535 |
| | | | 707/711 |
| 9,191,355 B2 | 11/2015 | Yerli | |
| 9,286,388 B2 | 3/2016 | Marsh | |

(Continued)

*Primary Examiner* — Hung D Le
(74) *Attorney, Agent, or Firm* — The Webb Law Firm (57) ABSTRACT

Disclosed is a system and computer-implemented method for collecting, storing, and presenting community information. The method includes storing in at least one database user data representative of a user preference, a user interest, personal identifying information, or any combination thereof. The method also includes retrieving resource data representative of an event, an activity, a medical resource, a community resource, or any combination thereof. The method further includes generating at least one data object including at least a portion of the resource data and storing the at least one data object in the at least one database. The method further includes generating at least one search parameter based at least partially on the user data, retrieving the at least one data object from the at least one database, and, generating a graphical representation of the at least one data object.

20 Claims, 8 Drawing Sheets

(56) References Cited

U.S. PATENT DOCUMENTS

| | | | |
|---|---|---|---|
| 9,288,275 B2 | 3/2016 | Jain et al. | |
| 9,342,837 B2 | 5/2016 | Garman | |
| 9,449,346 B1* | 9/2016 | Hockey | G06Q 40/02 |
| 10,068,172 B2* | 9/2018 | Sellers-Blais | G06N 5/025 |
| 2003/0055689 A1* | 3/2003 | Block | G06Q 20/206 |
| | | | 705/5 |
| 2003/0101451 A1 | 5/2003 | Bentolila et al. | |
| 2005/0251497 A1* | 11/2005 | Barth | G06Q 10/02 |
| 2008/0162199 A1* | 7/2008 | Smith | G06Q 10/02 |
| | | | 705/5 |

* cited by examiner

SYSTEM AND METHOD FOR COLLECTION AND STORAGE OF COMMUNITY INFORMATION

CROSS-REFERENCE TO RELATED APPLICATIONS

This application claims priority to U.S. Provisional Patent Application No. 62/374,134, entitled "System and Method for Collection and Storage of Community Information," filed Aug. 12, 2016, the disclosure of which is hereby incorporated in its entirety by reference.

BACKGROUND OF THE INVENTION

Field of the Invention

Disclosed embodiments relate generally to a system and method for a dynamic information connection engine, in particular, directed to building a searchable database from web data.

Description of Related Art

Various systems and methods exist that are directed to electronically searching for information, e.g., information accessible via the Internet. It has become increasingly popular to use those systems and methods to share personal interests, gather professional resources, and manage calendars, often incorporating the electronically searched information. In particular application to users who are caregivers, e.g., parents, guardians, and the like, searches frequently relate to gathering information about children's activities and events, medical professionals/facilities, and/or various resources available to the caregiving community. As the volume of available information increases, so does the amount of time and effort involved to search, process, and save the information. Specifically, caregivers must sort through information that does not interest them or apply to their situation, and even after locating relevant information, they must take the time to gather, record, and save the information to the relevant file storage and calendar applications. The need exists to streamline the information search and gather process. Furthermore, there exists a need to efficiently gather these resources, display them to users in an organized and intuitive manner, and tailor resources to the needs and interests of users and children.

SUMMARY OF THE INVENTION

Generally, provided are a system and method for collecting, storing, and presenting community information, preferably for use in connection with a processor and database for executing search parameters. Preferably, provided is a system and computer-implemented method for obtaining event, activity, medical resource, and/or community resource data. Preferably, provided is a system and computer-implemented method for generating a data object from obtained data and associating the data object with a keyword that is representative of a user preference and/or interest. Preferably, provided is a system and computer-implemented method for displaying the data object based at least partially on user data, the keyword, a search parameter, or any combination thereof.

According to one preferred and non-limiting embodiment or aspect, provided is a computer-implemented method for collecting, storing, and presenting community information. The method includes storing in at least one database, for each user of a plurality of users, user data representative of at least one of the following: a user preference, a user interest, personal identifying information, or any combination thereof. The method further includes retrieving resource data representative of at least one of the following: an event, an activity, a medical resource, a community resource, or any combination thereof. The method further includes generating at least one data object including at least a portion of the resource data, each data object of the at least one data object representative of one of: an event, an activity, a medical resource, and a community resource; and storing the at least one data object in the at least one database, the at least one database programmed or configured to store the at least one data object in association with at least one user of the plurality of users and at least one keyword representative of at least one of a user preference and a user interest. The method further includes generating at least one search parameter based at least partially on the user data, retrieving the at least one data object from the at least one database based at least partially on the at least one search parameter, and generating a graphical representation of at least one card, the graphical representation based at least partially on at least one of the following: the user data, the at least one keyword, the at least one search parameter, or any combination thereof. Each card of the at least one card is representative of a data object of the at least one data object and includes at least one of the following attributes: a title, a date, a time, a cost, a rating, a description, a location, or any combination thereof.

In further preferred and non-limiting embodiments or aspects, the method may include retrieving resource data by automatically searching and storing data from at least one of the following: community events websites, blogs, business websites, professional services databases, public calendars, or any combination thereof. The method may also include generating an electronic correspondence based at least partially on the user data of the at least one user, the electronic correspondence including at least a portion of the resource data of the at least one data object; and communicating the electronic correspondence to the at least one user.

According to one preferred and non-limiting embodiment or aspect, provided is a computer-implemented method for collecting, storing, and presenting community information, the method including storing in at least one database, for each user of a plurality of users, user data representative of at least one of the following: a user preference, a user interest, personal identifying information, or any combination thereof. The method includes storing in the at least one database, for each user of the plurality of users, a user profile configured to be associated with at least one child profile, the at least one child profile including at least one of the following attributes: an age, a gender, an interest, or any combination thereof. The method further includes retrieving resource data representative of at least one of the following: an event, an activity, a medical resource, a community resource, or any combination thereof. The method further includes generating at least one data object including at least a portion of the resource data, each data object of the at least one data object representative of one of: an event, an activity, a medical resource, and a community resource; and storing the at least one data object in the at least one database, the at least one database programmed or configured to store the at least one data object in association with at least one user of the plurality of users, and at least one keyword representative of at least one of a user preference and a user interest. The method further includes generating at least one search parameter based at least partially on the user data, retrieving the at least one data object from the at least one database based at least partially on the at least one search parameter, and generating a graphical representation of the at least one data object based at least partially on at least one of the following: the user data, the at least one keyword, the at least one search parameter, or any combination thereof.

In further preferred and non-limiting embodiments or aspects, the at least one search parameter may be based at least partially on input by a first user, the input including at least one of the following: a search term, a resource type, a resource subtype, a specialty, a date, a time, a location, or any combination thereof. The method may include, in response to receiving the input by the first user, generating the graphical representation as a plurality of cards representative of a plurality of data objects, the plurality of cards being organized at least partially by relevance to the input, and each card of the plurality of cards displaying at least one of the following attributes: a title, a date, a time, a cost, a rating, a description, a location, or any combination thereof. The plurality of cards may be organized at least partially by relevance to at least one attribute of the at least one child profile associated with the user profile of the first user. The plurality of cards may also be organized at least partially by proximity to a location attribute of the user profile of the first user.

In further preferred and non-limiting embodiments or aspects, the method may include generating an electronic correspondence based at least partially on at least one attribute of at least one child profile, the electronic correspondence including at least a portion of the resource data of the at least one data object; and communicating the electronic correspondence to the at least one user. The at least one database may be programmed or configured to associate at least one plurality of data objects with the at least one user, the at least one plurality of data objects grouped by user designation.

According to one preferred and non-limiting embodiment or aspect, provided is a computer-implemented method for collecting, storing, and presenting community information. The method includes storing in at least one database, for each user of a plurality of users, user data representative of at least one of the following: a user preference, a user interest, personal identifying information, or any combination thereof. The method further includes retrieving resource data representative of at least one of the following: an event, an activity, a medical resource, a community resource, or any combination thereof. The method further includes generating at least one data object including at least a portion of the resource data, each data object of the at least one data object representative of one of: an event, an activity, a medical resource, and a community resource; and storing the at least one data object in the at least one database. The at least one, database is programmed or configured to: store the at least one data object in association with at least one user of the plurality of users; store the at least one data object in association with at least one keyword representative of at least one of a user preference and a user interest; and facilitate a user query of the at least one database to retrieve the at least one data object. The method further includes generating at least one search parameter based at least partially on the user data, retrieving the at least one data object from the at least one database based at least partially on the at least one search parameter, and generating a graphical representation of the at least one data object based at least partially on at least one of the following: the user data, the at least one keyword, the at least one search parameter, or any combination thereof.

In further preferred and non-limiting embodiments or aspects, the method may include retrieving resource data by automatically searching and storing data from at least one of the following: community events websites, blogs, business websites, professional services databases, public calendars, or any combination thereof. The at least one search parameter may be based at least partially on input by a first user, the input including at least one of the following: a search term, a resource type, a resource subtype, a specialty, a date, a location, or any combination thereof. The method may also include, in response to receiving the input by the first user, generating the graphical representation as a plurality of cards representative of a plurality of data objects, the plurality of cards being organized at least partially by relevance to the input, and each card of the plurality of cards displaying at least one of the following attributes: a time, a rating, a description, a location, or any combination thereof. The plurality of cards may be organized at least partially by proximity to a location attribute of the user profile of the first user. The graphical representation may include at least one suggested card of the plurality of cards having high relevance to the input, the at least one suggested card being designated as a top suggestion and being graphically represented as visually distinct from other cards.

In further preferred and non-limiting embodiments or aspects, the method may include associating the at least one data object with a time attribute representative of a current or future event, the time attribute including at least one of the following: a start time, an end time, a duration, or any combination thereof. The method may also include generating the graphical representation of the at least one data object based at least partially on the time attribute. The method may further include generating an electronic correspondence based at least partially on the user data of the at least one user, the electronic correspondence including at least a portion of the resource data of the at least one data object; and communicating the electronic correspondence to the at least one user, wherein communication of the electronic correspondence is conditioned on the time attribute. The at least one database may be programmed or configured to associate at least one plurality of data objects with the at least one user, the at least one plurality of data objects grouped by user designation.

Other preferred and non-limiting embodiments or aspects of the present invention will be set forth in the following numbered clauses:

Clause 1: A computer-implemented method for collecting, storing, and presenting community information, comprising: storing in at least one database, for each user of a plurality of users, user data representative of at least one of the following: a user preference, a user interest, personal identifying information, or any combination thereof; retrieving resource data representative of at least one of the following: an event, an activity, a medical resource, a community resource, or any combination thereof; generating at least one data object comprising at least a portion of the resource data, each data object of the at least one data object representative of one of: an event, an activity, a medical resource, and a community resource; storing the at least one data object in the at least one database, the at least one database programmed or configured to store the at least one data object in association with at least one user of the plurality of users and at least one keyword representative of at least one of a user preference and a user interest; generating at least one search parameter based at least partially on the user data;

retrieving the at least one data object from the at least one database based at least partially on the at least one search parameter; and generating a graphical representation of at least one card, the graphical representation based at least partially on at least one of the following: the user data, the at least one keyword, the at least one search parameter, or any combination thereof; and each card of the at least one card representative of a data object of the at least one data object and comprising at least one of the following attributes: a title, a date, a time, a cost, a rating, a description, a location, or any combination thereof.

Clause 2: The method of clause 1, further comprising retrieving resource data by automatically searching and storing data from at least one of the following: community events websites, blogs, business websites, professional services databases, public calendars, or any combination thereof.

Clause 3: The method of clauses 1 or 2, further comprising generating an electronic correspondence based at least partially on the user data of the at least one user, the electronic correspondence comprising at least a portion of the resource data of the at least one data object; and communicating the electronic correspondence to the at least one user.

Clause 4: A computer-implemented method for collecting, storing, and presenting community information, comprising: storing in at least one database, for each user of a plurality of users, user data representative of at least one of the following: a user preference, a user interest, personal identifying information, or any combination thereof; storing in the at least one database, for each user of the plurality of users, a user profile configured to be associated with at least one child profile, the at least one child profile comprising at least one of the following attributes: an age, a gender, an interest, or any combination thereof; retrieving resource data representative of at least one of the following: an event, an activity, a medical resource, a community resource, or any combination thereof; generating at least one data object comprising at least a portion of the resource data, each data object of the at least one data object representative of one of: an event, an activity, a medical resource, and a community resource; storing the at least one data object in the at least one database, the at least one database programmed or configured to store the at least one data object in association with at least one user of the plurality of users and at least one keyword representative of at least one of a user preference and a user interest; generating at least one search parameter based at least partially on the user data; retrieving the at least one data object from the at least one database based at least partially on the at least one search parameter; and generating a graphical representation of the at least one data object based at least partially on at least one of the following: the user data, the at least one keyword, the at least one search parameter, or any combination thereof.

Clause 5: The method of clause 4, wherein the at least one search parameter is based at least partially on input by a first user, the input comprising at least one of the following: a search term, a resource type, a resource subtype, a specialty, a date, a time, a location, or any combination thereof.

Clause 6: The method of clauses 4 or 5, further comprising, in response to receiving the input by the first user, generating the graphical representation as a plurality of cards representative of a plurality of data objects, the plurality of cards being organized at least partially by relevance to the input, and each card of the plurality of cards displaying at least one of the following attributes: a title, a date, a time, a cost, a rating, a description, a location, or any combination thereof.

Clause 7: The method of any of clauses 4-6, wherein the plurality of cards is organized at least partially by relevance to at least one attribute of the at least one child profile associated with the user profile of the first user.

Clause 8: The method of any of clauses 4-7, wherein the plurality of cards is organized at least partially by proximity to a location attribute of the user profile of the first user.

Clause 9: The method of any of clauses 4-8, further comprising generating an electronic correspondence based at least partially on at least one attribute of at least one child profile, the electronic correspondence comprising at least a portion of the resource data of the at least one data object; and communicating the electronic correspondence to the at least one user.

Clause 10: The method of any of clauses 4-9, wherein the at least one database is programmed or configured to associate at least one plurality of data objects with the at least one user, the at least one plurality of data objects grouped by user designation.

Clause 11: A computer-implemented method for collecting, storing, and presenting community information, comprising: storing in at least one database, for each user of a plurality of users, user data representative of at least one of the following: a user preference, a user interest, personal identifying information, or any combination thereof; retrieving resource data representative of at least one of the following: an event, an activity, a medical resource, a community resource, or any combination thereof; generating at least one data object comprising at least a portion of the resource data, each data object of the at least one data object representative of one of: an event, an activity, a medical resource, and a community resource; storing the at least one data object in the at least one database, the at least one database programmed or configured to: store the at least one data object in association with at least one user of the plurality of users; store the at least one data object in association with at least one keyword representative of at least one of a user preference and a user interest; and facilitate a user query of the at least one database to retrieve the at least one data object; generating at least one search parameter based at least partially on the user data; retrieving the at least one data object from the at least one database based at least partially on the at least one search parameter; and generating a graphical representation of the at least one data object based at least partially on at least one of the following: the user data, the at least one keyword, the at least one search parameter, or any combination thereof.

Clause 12: The method of clause 11, further comprising retrieving resource data by automatically searching and storing data from at least one of the following: community events websites, blogs, business websites, professional services databases, public calendars, or any combination thereof.

Clause 13: The method of clauses 11 or 12, wherein the at least one search parameter is based at least partially on input by a first user, the input comprising at least one of the following: a search term, a resource type, a resource subtype, a specialty, a date, a location, or any combination thereof.

Clause 14: The method of any of clauses 11-13, further comprising, in response to receiving the input by the first user, generating the graphical representation as a plurality of cards representative of a plurality of data objects, the plurality of cards being organized at least partially by relevance to the input, and each card of the plurality of cards displaying at least one of the following attributes: a time, a rating, a description, a location, or any combination thereof.

Clause 15: The method of any of clauses 11-14, wherein the plurality of cards is organized at least partially by proximity to a location attribute of the user profile of the first user.

Clause 16: The method of any of clauses 11-15, wherein the graphical representation comprises at least one suggested card of the plurality of cards having high relevance to the input, the at least one suggested card being designated as a top suggestion and being graphically represented as visually distinct from other cards.

Clause 17: The method of any of clauses 11-16, further comprising associating the at least one data object with a time attribute representative of a current or future event, the time attribute comprising at least one of the following: a start time, an end time, a duration, or any combination thereof.

Clause 18: The method of any of clauses 11-17, further comprising generating the graphical representation of the at least one data object based at least partially on the time attribute.

Clause 19: The method of any of clauses 11-18, further comprising: generating an electronic correspondence based at least partially on the user data of the at least one user, the electronic correspondence comprising at least a portion of the resource data of the at least one data object; and communicating the electronic correspondence to the at least one user, wherein communication of the electronic correspondence is conditioned on the time attribute.

Clause 20: The method of any of clauses 11-19, wherein the at least one database is programmed or configured to associate at least one plurality of data objects with the at least one user, the at least one plurality of data objects grouped by user designation.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and process illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

Figure 1:
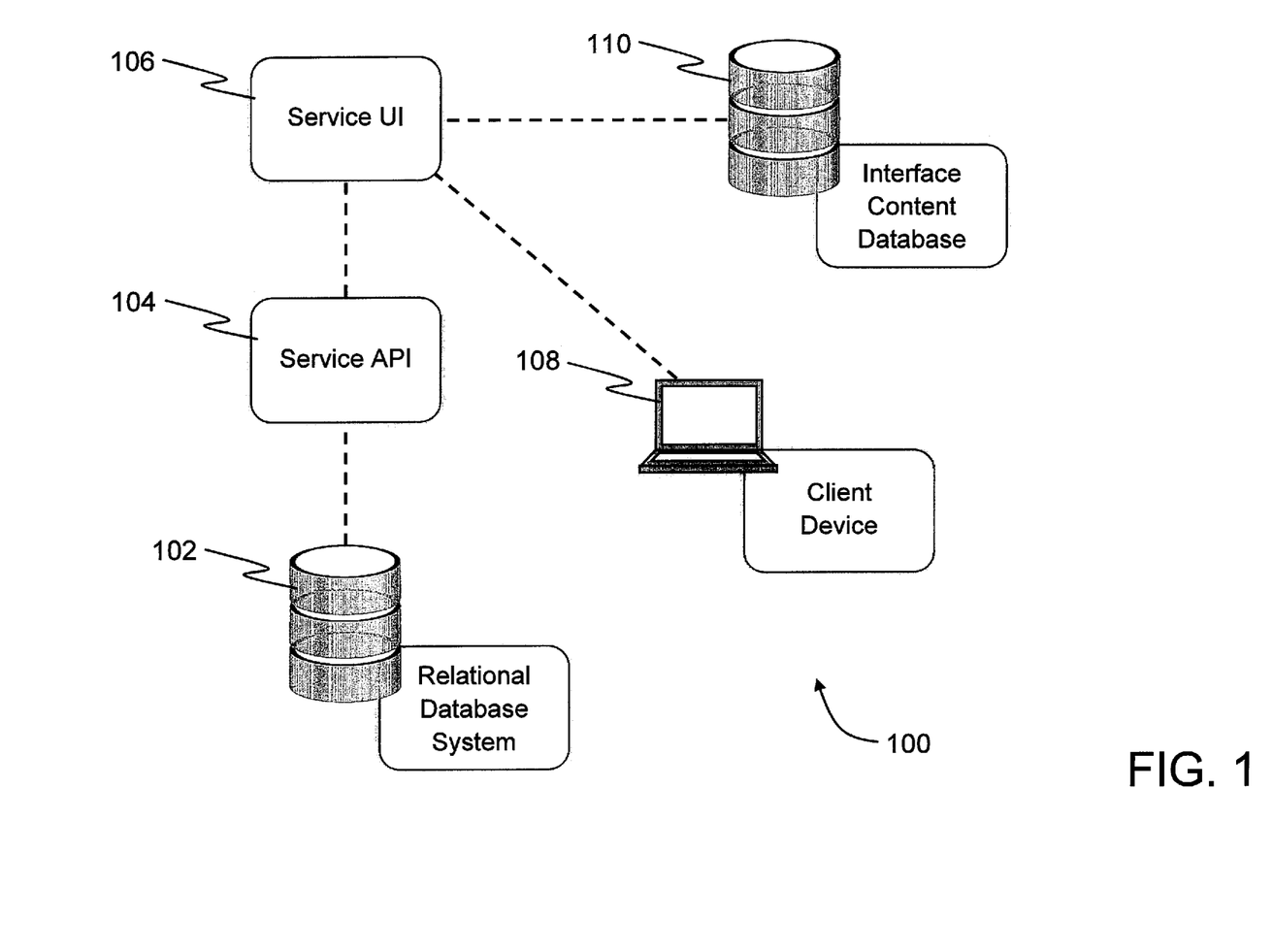
FIG. 1 is a schematic diagram of one embodiment or aspect of a system for collecting, storing, and presenting community information according to the principles of the present invention.

With specific reference to FIG. 1, and in one preferred and non-limiting embodiment or aspect, provided is a schematic diagram of a system 100 for collecting, storing, and presenting community information according to the principles of the present invention. The system 100 may include a relational database system 102, which is used for storing content and user data, and which is in communication with and controlled by a processor, e.g., a computer. User data may include, for example, user preferences, user interests, personal identifying information, and/or the like. The processor operates a service application programming interface (API) 104 that defines the functionality for a service user interface (UI) 106. A user may use a client device 108, e.g., a desktop computer, a laptop computer, a smartphone, a tablet, and/or any like device, to interact with the service UI 106, which pulls display content from an interface content database 110. Through the service UI 106, the user may gain access to content stored in the relational database system 102.

With further reference to FIG. 1, and in further preferred and non-limiting embodiments or aspects, a system administrator may manually search for content, e.g., events, activities, medical resources, community resources, and/or the like, to populate the relational database system 102. Example events and activities may relate to libraries, entertainment, art, sports, museums, zoos, recreational parks, theme parks, amusement parks, theatrical productions, charity drives, educational programs, learning programs, socialization programs, and/or the like. Example medical resources may be doctors, physicians, medical practices, medical care facilities, medical advisors, therapists, and/or the like. Example community resources may be religious services, charity services, educational and learning services, child care services, developmental disability services, peer support services, listservs, mind and body services and/or the like. It will be appreciated that content may be directed to various other types and subtypes. Content may be stored in the relational database system 102 as data objects, each data object associated with a user and/or a keyword, which may represent a user preference and/or user interest, e.g., preferences or interests of a caregiver or a child. Example sources of content may be community events websites, blogs, business websites, professional services databases, public calendars, and/or the like. A processor in communication with the relational database system 102 and the Internet may also be configured to automatically search and retrieve relevant content by executing an automated code or script, which may also be referred to as a "web crawler." In this manner, a user of the described system does not have to search, filter, or categorize content on their own. In specific application to caregivers, a caregiver uses a client device 108 to access the service UI 106 and view collected content concerning events, activities, medical resources, community resources, and/or the like that are of interest to them and their child.

With further reference to FIG. 1, and in further preferred and non-limiting embodiments or aspects, at least one processor in communication with the relational database system 102 may generate at least one data object that includes at least a portion of the resource data stored in the relational database system 102. Each data object of the at least one data object may represent an event, an activity, a medical resource, a community resource, and/or the like. Data objects may be stored in the relational database system 102, and the data objects may be stored in association with one or more users and keywords. When a user, on a client device 108, enters one or more search terms, at least one processor in communication with the relational database system 102 may generate a search parameter, which may also be based on the stored user data. The processor may retrieve one or more data objects from the relational database system 102 based at least partially on the generated search parameter, and a same or different processor may generate a graphical representation of the one or more retrieved data objects for display on the client device 108. A preferred but non-limiting example of a graphical representation includes a card-based layout, as further detailed in FIGS. 3-6. Cards may include one or more attributes, such as a title, a date, a time, a cost, a rating, a description, a location, or any combination thereof. It will be appreciated that many configurations are possible.

Figure 2:
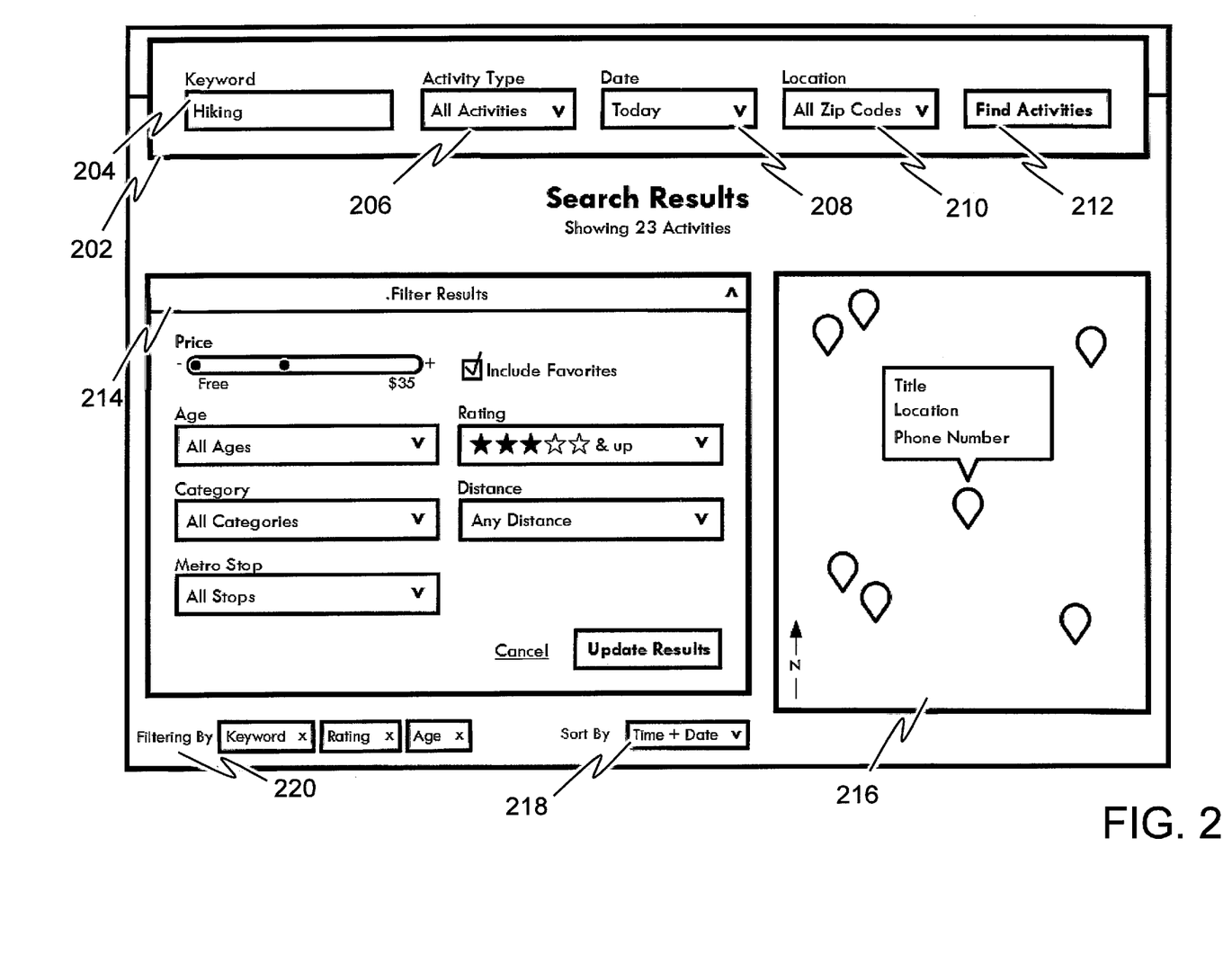
FIG. 2 is an example search view of a user interface of one embodiment or aspect of a system for collecting, storing, and presenting community information according to the principles of the present invention.

With specific reference to FIG. 2, and in one preferred and non-limiting embodiment or aspect, provided is an example search view of a user interface of a system for collecting, storing, and presenting community information according to the principles of the present invention. The search view may be programmed or configured to be communicated to a client device for user interaction. The search view may include a search pane 202 for querying a service database for event data, activity data, medical resource data, community resource data, and/or the like. The search pane 202 may include: a keyword search field 204, an activity type filter 206, a date filter 208, a location filter 210, a submit search control 212, or any combination thereof. It will be appreciated that more or fewer filters may be used, or none at all, in conducting a keyword search. Based at least partially on the search pane and/or user data, search parameters are generated. For example, search parameters may include a resource type, i.e., an event, an activity, a medical resource, a community resource, or any combination thereof. Search parameters may also include a resource subtype, which may be any category thereof, e.g., libraries, entertainment, art, sports, museums, zoos, and/or the like when searching for events/activities, or religious services, charity services, educational and learning services, child care services, developmental disability services, peer support services, listservs, mind and body services, and/or the like when searching for community resources. Search parameters may further include specialties, e.g., pediatricians, dentists, optometrists, gynecologists, and/or the like when searching for medical resources. Moreover, search parameters may include dates, times, locations, and/or the like and may be included individually or in combination with any of the above. When a user submits the search query, including the keyword search field 204 and any selected filters, the search interface may communicate with an underlying database through a service API and return relevant search results that may be one or more data objects, which may be data representative of events, activities, medical resources, community resources, and/or other like. The data objects may be graphically represented as cards, i.e., modular, geometric fields displaying at least partial data from the data object, a card preferably being configured to be displayed with other cards in a regular pattern for review by the user. It will be appreciated that many configurations of data object cards are possible.

With further reference to FIG. 2, and in a further preferred and non-limiting embodiment or aspect, the search view may also include a filter pane 214 to provide additional functionality for filtering search results. The filter pane 214 may include, for example, a price filter, a favorites filter, a participant age filter, a rating filter, a category filter, a distance filter, a navigation filter (e.g., a filter for selecting a specific bus stop or train stop), or any combination thereof. It will be appreciated that other parameters and/or filters may be provided to the user. Further, filters may differ based on what resource type is being searched, configured to dynamically change based on the type of content being searched. A location map 216 may also be provided to display the location of activities, events, medical resources, community resources, and/or the like that were returned in the search results. Additionally, the search results may be sorted by one or more parameters using a sort tool 218, and active search filters 220 may also be displayed to the user, with the ability to remove individual filters. It will be appreciated that other configurations are possible.

Figure 3:
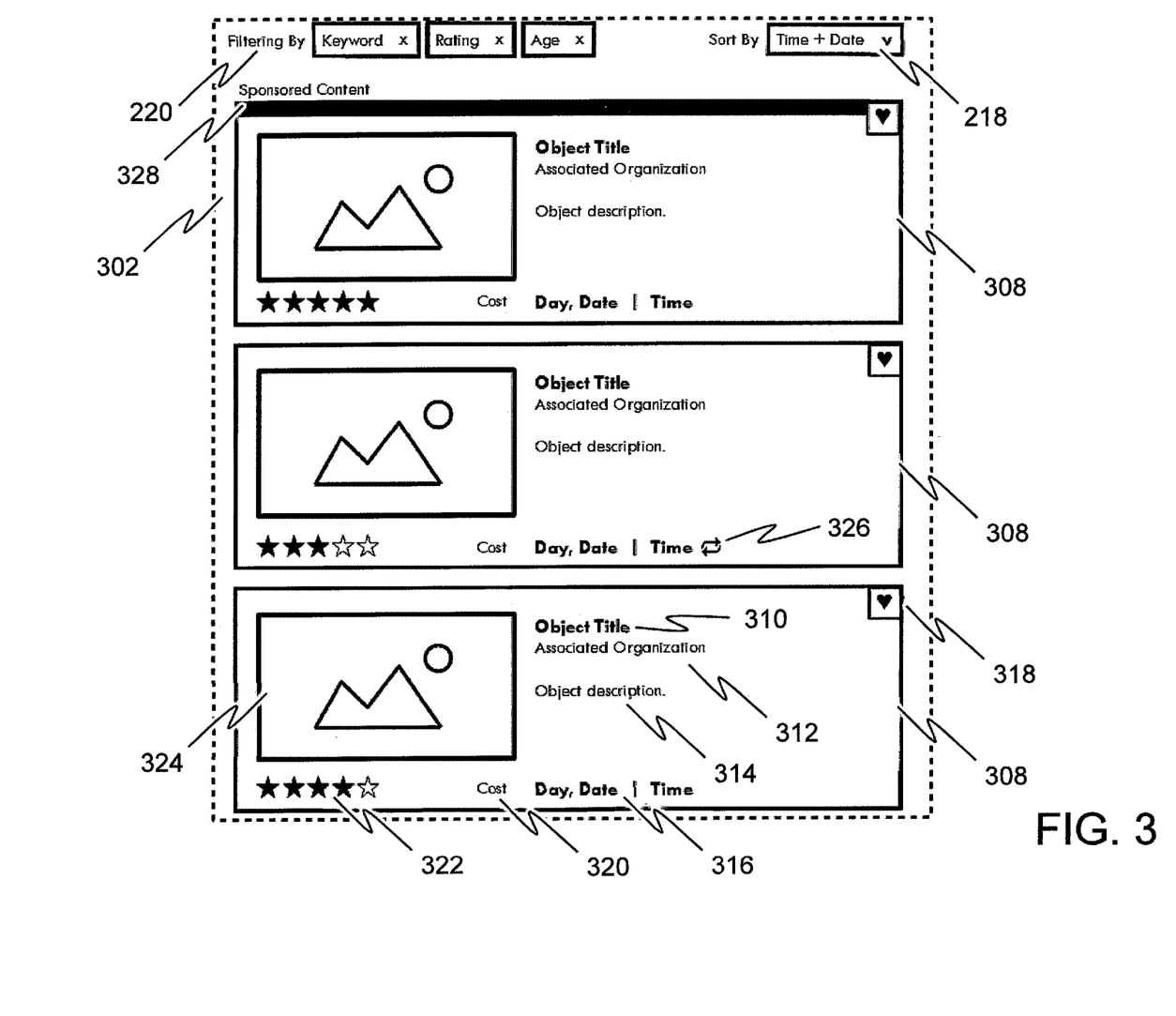
FIG. 3 is an example search results view of a user interface of one embodiment or aspect of a system for collecting, storing, and presenting community information according to the principles of the present invention.

With specific reference to FIG. 3, and in one preferred and non-limiting embodiment or aspect, provided is an example search results view of a user interface of a system for collecting, storing, and presenting community information according to the principles of the present invention. The search results view may be used in conjunction with the search view of FIG. 2. In particular, the search results view may include the same active search filters 220 and a sort tool 218. The data objects are displayed as cards 308 that include: a title 310, an associated organization 312, a description 314, a time 316, a favorite flag 318, a cost 320, a rating 322, a picture 324, a repeating event flag 326, a sponsored content flag 328, or any combination thereof. The cards 308 may be sorted by one or more criteria selected in the sort tool 218. Cards 308 that are flagged as sponsored content may be placed at the top of the search results list. Cards 308 may also be determined to be a top suggestion for having high relevance to a search input or other criteria. Top suggested cards 308 may be visually distinct from other content, such as through color, outline, shadow, glow, bloom, movement, formatting, and/or the like. Clicking or selecting a card 308, or one or more card elements, may direct the user to a data object detail view that provides a more complete display of data associated with the selected card 308. It will be appreciated that other configurations are possible.

Figure 4:
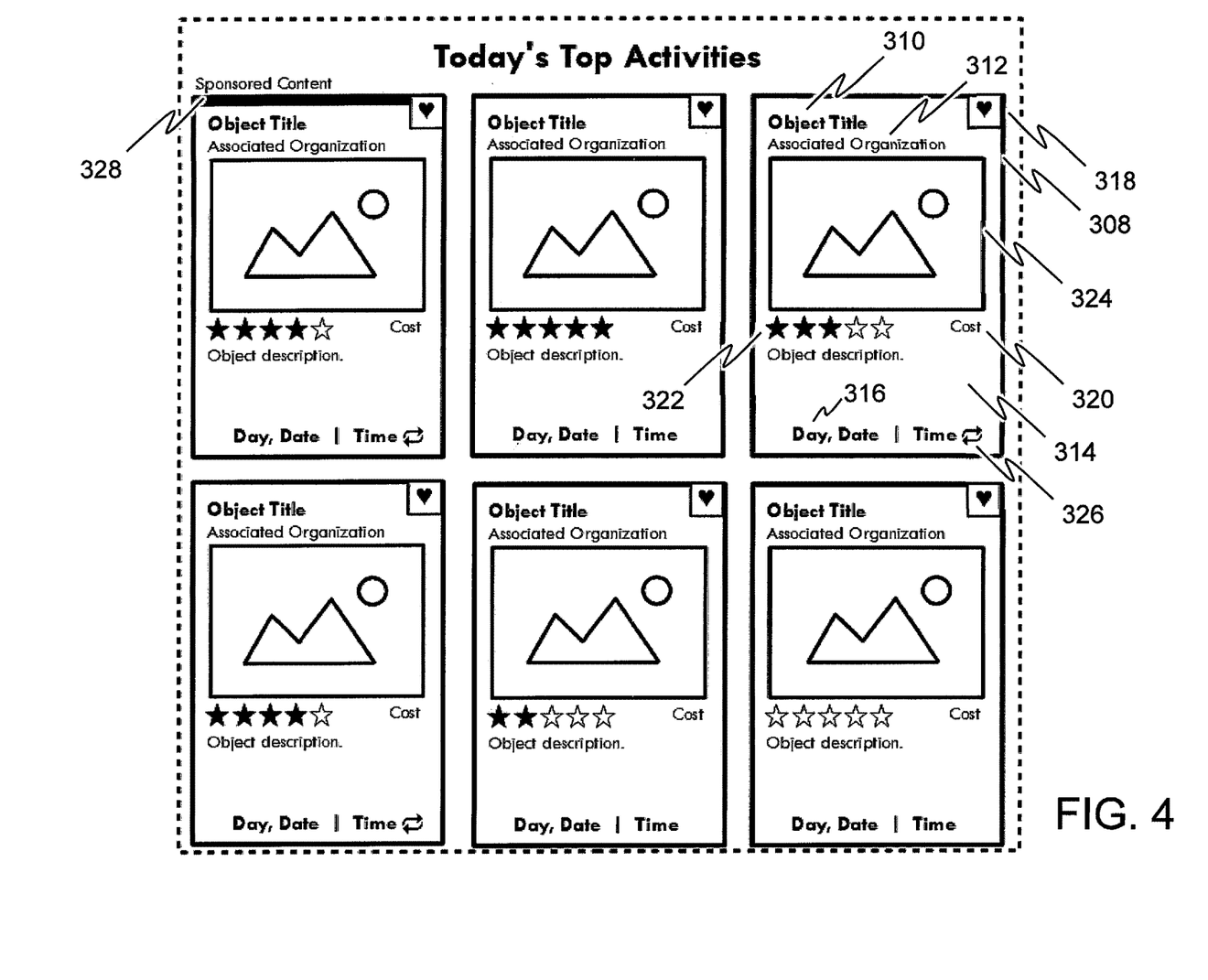
FIG. 4 is an example data object view of a user interface of one embodiment or aspect of a system for collecting, storing, and presenting community information according to the principles of the present invention.

With specific reference to FIG. 4, and in one preferred and non-limiting embodiment or aspect, provided is an example data object view of a user interface of a system for collecting, storing, and presenting community information according to the principles of the present invention. The data object view may be used in conjunction with the search view of FIG. 2 and may include the same active search filters 220 and a sort tool 218. It will be appreciated that the data object view may also be used to display a suggested or predetermined selection of events, activities, medical resources, community resources, and/or the like, such as on a home page. Suggested content may be formatted as top suggestions, as described above. The data objects are displayed as cards 308 which include: title 310, associated organization 312, description 314, time 316, favorite flag 318, cost 320, rating 322, picture 324, repeating event flag 326, sponsored content flag 328, or any combination thereof. The cards 308 may be sorted by the user or by a predetermined method, such as by sponsored content first, proximity second, and potential user interest third. Moreover, more than one data object element or parameter may be used in combination to create a combined sorting metric. Clicking or selecting the card 308, or one or more card elements, may direct the user to a detail view which provides a more complete display of data associated with the selected card 308. It will be appreciated that other configurations are possible.

Figure 5:
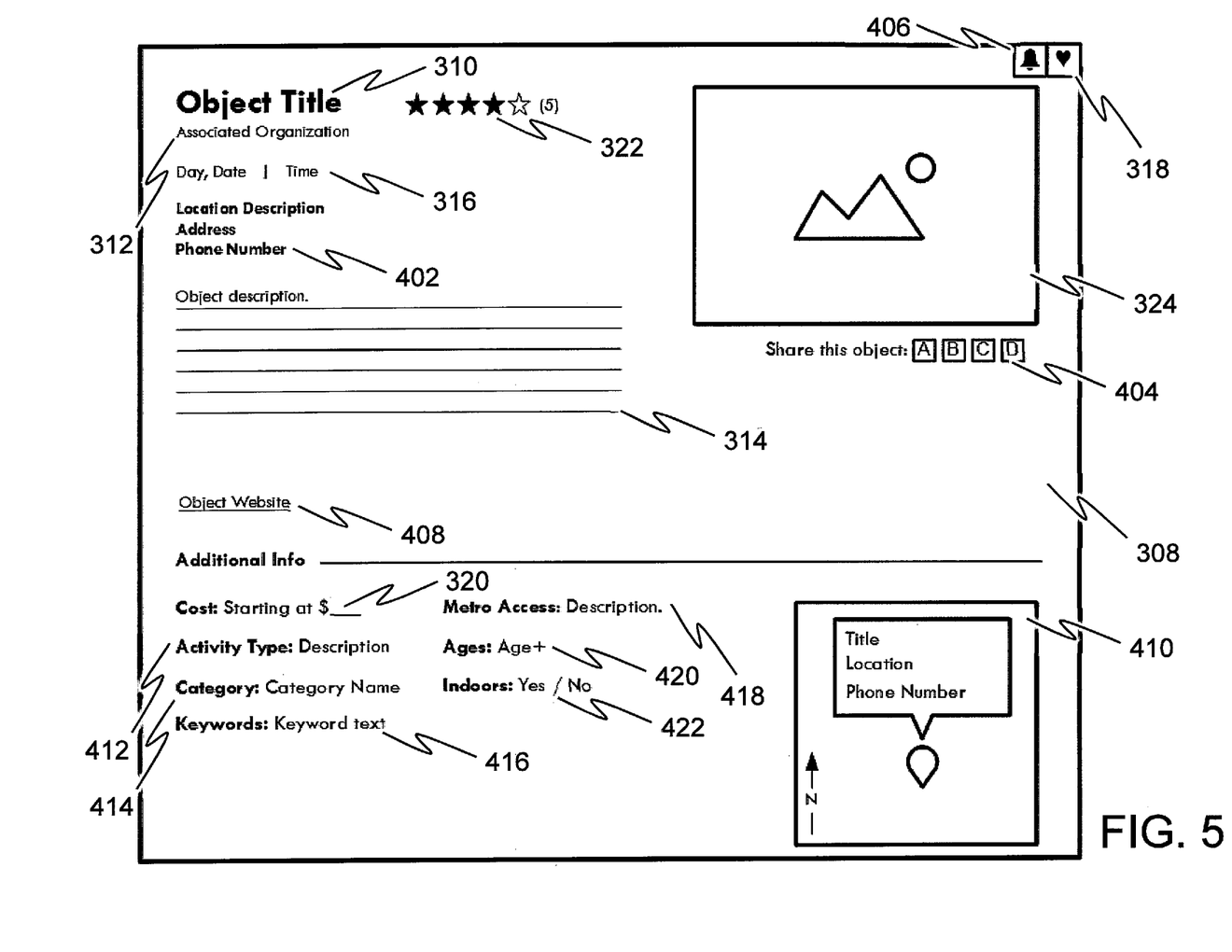
FIG. 5 is an example data object detail view of a user interface of one embodiment or aspect of a system for collecting, storing, and presenting community information according to the principles of the present invention.

With specific reference to FIG. 5, and in one preferred and non-limiting embodiment or aspect, provided is an example data object detail view of a user interface of a system for collecting, storing, and presenting community information according to the principles of the present invention. The data object may be displayed as the card 308 with its various parameters and elements visible, or expandable, for a user to view. These elements or parameters may include: a title 310, an associated organization 312, description 314, time 316, favorite flag 318, cost 320, rating 322, picture 324, contact information 402, social media plug-ins 404, a reminder flag 406, an external hyperlink 408, a location map 410, an activity type 412, a category 414, a keyword list 416, a public transportation description 418, an age range 420, a location description 422, or any combination thereof. It will be appreciated that these elements and parameters are given as examples and are not exhaustive, and other elements and parameters may be used for other events, activities, medical resources, community resources, and/or the like. Moreover, the picture 324 may be an icon, a stock photo, a third party-provided image, a user-provided image, an administrator-provided image, or any like image. Further, the time 316, as used throughout and to describe the card attribute, may be one or more of a start time, an end time, a duration, and/or the like and may include a calendar date, an hour, a minute, a second, or any combination thereof. The purpose of the data object detail view is to provide a user with sufficient relevant information about an event, activity, medical resource, community resource, and/or the like, as well as to provide further functionality for saving the data object, viewing similar events/activities/resources, setting reminders, adding the object to a calendar, gathering more information, or any combination thereof. Moreover, the detail view may facilitate a rating and/or review system, in which users may rate the resource and view, edit, save, delete, or submit comments, which may be represented by the rating 322 label. It will be appreciated that other configurations are possible.

With further reference to FIG. 5, and in further preferred and non-limiting embodiments or aspects, the reminder flag 406 may be used in combination with the time 316 attribute of a data object to provide reminders to the user about upcoming events, activities, medical resource appointments, community resources, and/or the like. For a data object that represents a singularly occurring event, the reminder may provide advanced notice of the event. For a data object that represents a reoccurring event, the reminder may periodically provide advanced notice of the event. For a data object that represents a long term event with a definite end time or date, the reminder may provide advanced notice of the event's conclusion. The user interface may also integrate with a user's personal electronic calendar, which may be a part of the user interface or provided by a third party calendar service. In addition, suggested data objects may be displayed along with the selected data object of the detail view of FIG. 5, such as presented below the detail view in a card-based representation, as shown in FIGS. 3 and 4. Suggested data objects may be of a same or different data object type, e.g., event, activity, medical resource, community resource, and/or the like. The suggested data objects may be automatically selected and displayed based on any one or more parameters, such as user data, search history, search criteria, ongoing promotions, and/or the like. It will be appreciated that many arrangements and configurations are possible.

Figure 6:
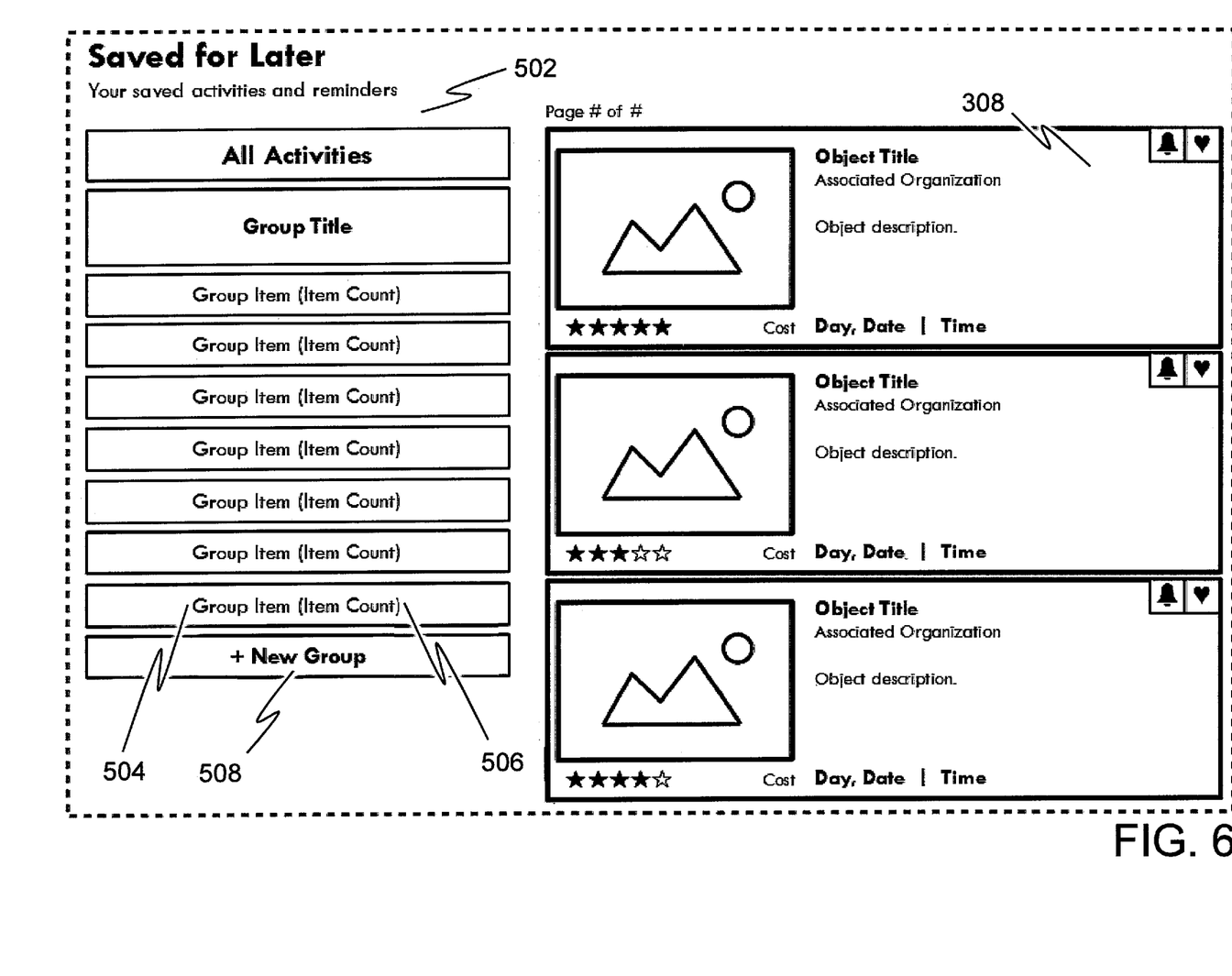
FIG. 6 is an example folder view of a user interface of one embodiment or aspect of a system for collecting, storing, and presenting community information according to the principles of the present invention.

With specific reference to FIG. 6, and in one preferred and non-limiting embodiment or aspect, provided is an example folder view of a user interface of a system for collecting, storing, and presenting community information according to the principles of the present invention. The folder view depicts a web page for the categorization and organizing of data, objects depicted as cards 308. Shown is a list of folders 502, at least some of which may be user-created and at least some of which may be predetermined. Each folder of the list of folders 502 may have a folder title 504 and folder card count 506. Folders are configured to correspond to one or more cards 308. A card 308 may also belong to one or more folders. The list of folders 502 may also include the option to create a new folder group 508. This allows the user to organize data objects as cards and visually categorize and organize data relevant to the user.

Figure 7:
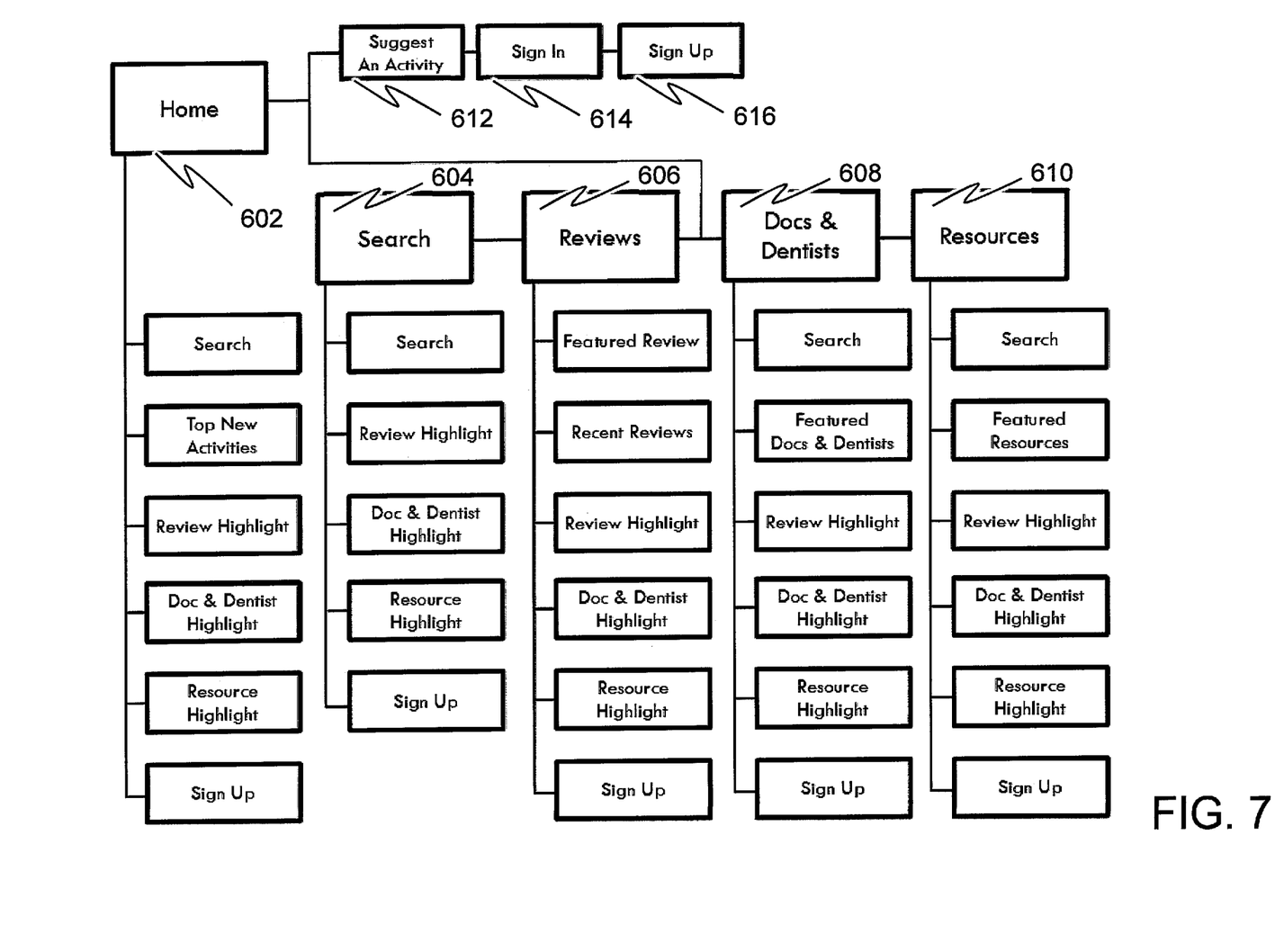
FIG. 7 is a schematic diagram of one embodiment or aspect of a system for collecting, storing, and presenting community information according to the principles of the present invention; and, FIG. 8 is a schematic diagram of one embodiment or aspect of a system for collecting, storing, and presenting community information according to the principles of the present invention.

With specific reference to FIG. 7, and in one preferred and non-limiting embodiment or aspect, provided is a schematic diagram of a system for collecting, storing, and presenting community information according to the principles of the present invention. The schematic diagram depicts a navigational hierarchy of a home page of the user interface, wherein the user viewing the home page is not signed into a registered user account. The schematic diagram depicts a relational node tree of selectable page links, which may be displayed as a home page 602 and a navigation bar with primary categories: search 604, reviews 606, doctors and dentists 608, and resources 610. Each category link directs the user to a generic version of a web page for that category, and the interface may limit the content that a non-registered user may view in each category. For example, the search 604 category provides a non-registered user access to a generic search page, content review highlights, doctor and dentist highlights, resource highlights, and a prompt to sign up for an account. At the top of the home page 602 are three constant links for users to suggest an activity 612, sign into an existing user account 614, or sign up for a user account 616.

Figure 8:
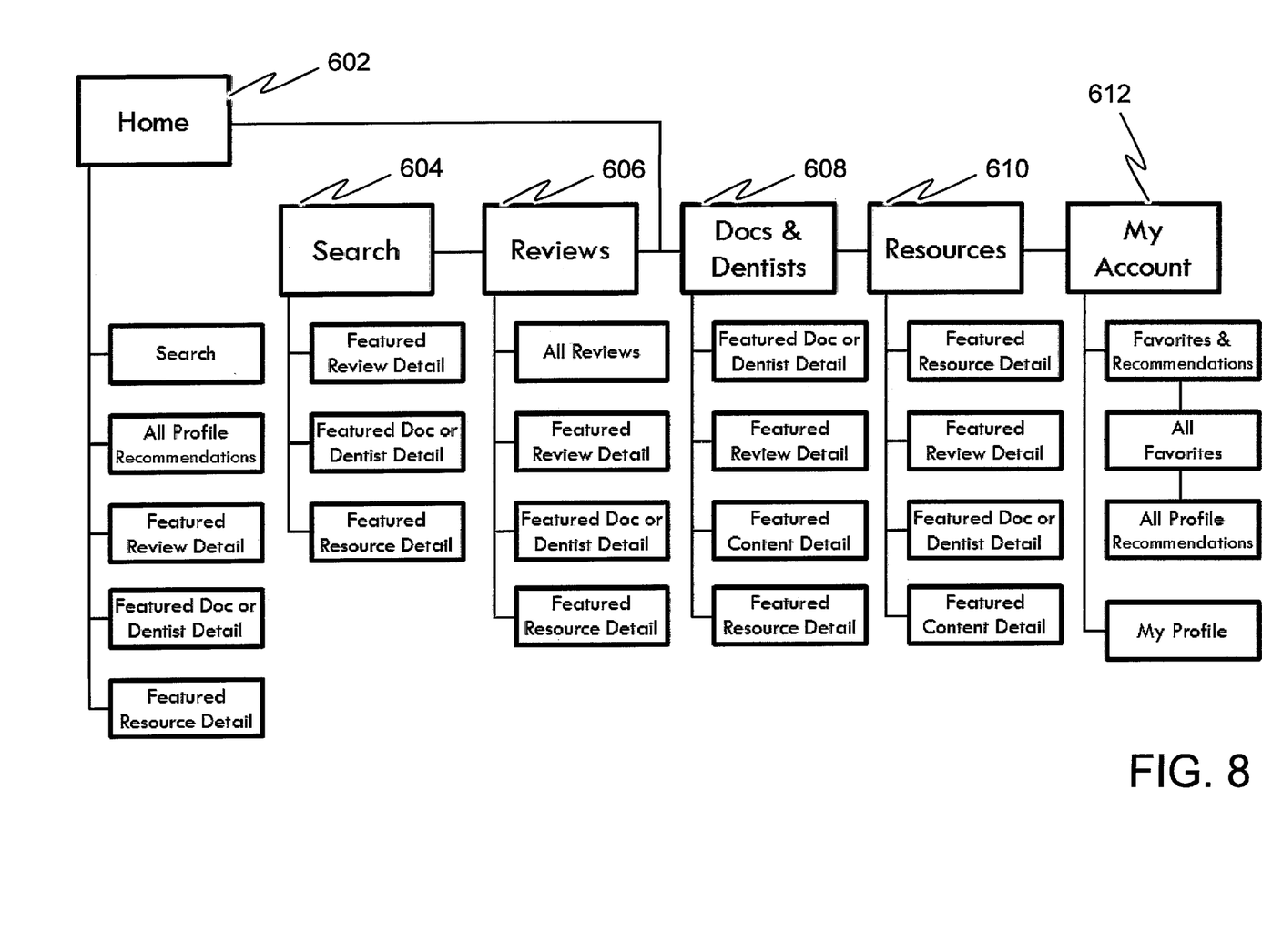

With specific reference to FIG. 8, and in one preferred and non-limiting embodiment or aspect, provided is a schematic diagram of a system for collecting, storing, and presenting community information according to the principles of the present invention. The schematic diagram depicts a navigational hierarchy of a home page of the user interface, wherein the user viewing the home page is signed into a registered user account. A user account may be associated with favorite content, recommended content, and user-specific profile data, such as zip code, user name, linked social media accounts, and/or the like. The schematic diagram depicts a node tree of selectable page links, which may be displayed as the home page 602 and a navigation bar with primary categories: search 604, reviews 606, doctors and dentists 608, resources 610, and user account 612. Each category link directs the user to a user-tailored version of a web page for that category, and the interface may configure the content that a registered user may view in each category. For example, the search 604 category provides a registered user access to a user-tailored search page, which may contain featured review details, featured doctor or dentist details, and/or featured resource details.

With further reference to the preceding figures, and particular reference to FIGS. 7 and 8, and in further preferred and non-limiting embodiments or aspects, a public, i.e., nonregistered, visitor of the user interface website may receive limited access to content. For example, a public visitor may view general top suggested activities (or events) on the home page of the user interface. The displayed activities may be sorted by date, with the first activities displayed being those occurring on the current date. Moreover, sponsored activities may be displayed next, followed by "top" activities that are ordered by creation date and unique ID. In contrast, a logged-in registered user would view a different configuration of data, which may depend on whether the user account is associated with user profile data. For specific application to caregivers, the user account may be associated with one or more child profiles, each profile associated with identifying data and/or child preferences, so that provided content may be organized by relevance to a particular child. Data associated with the child profile may be age, gender, interests, and/or the like. For the purposes of description herein, user preferences and user interests may describe those of a caregiver or a child. In an example configuration, the top suggested activities for a logged-in user with no associated child profiles may be sorted by: the current date, sponsored activities, top activities within a predetermined range of the user's zip code, and top activities outside of the predetermined range. Top suggested activities for a logged-in user with at least one associated child profile may be sorted by: sponsored activities, top activities matching a child's preferences within a predetermined range of the user's zip code, top activities not matching a child's preferences within the predetermined range, and remaining activities outside of the predetermined range. Other arrangements or configurations are possible.

With further reference to the foregoing figures, data object content may also be generated by user suggestion. For example, events, activities, medical resources, community resources, and/or the like may be submitted to the service through the user interface via a suggestion web page. The submitted content may be reviewed by a service administrator before the suggested content is stored and made accessible to users along with already generated content. Moreover, content may be communicated to users without requiring direct access to the user interface. The system may employ a process for comparing content data to user data and determining when particular content matches user or child preferences, interests, and/or the like. For example, a user profile that is associated with a nine-year old child profile with interests related to sports and museums may be associated with content relating to a "History of Sports" display at a local museum that is directed to children 6-16 years of age. Content that matches or relates to user preferences, interests, and/or the like may be formatted or configured in an electronic correspondence, e.g., an email, an online alert window, a text, a phone call, a voicemail, an app notification, and/or the like. Electronic correspondences may be conditioned based on a time attribute of the content, such as content occurring that day, that week, that month, etc., or ongoing content that is ceasing that day, that week, that month, etc. The system would then communicate the electronic correspondence to the user, thereby informing the user of events, activities, medical resources, community resources, and/or the like. It will be appreciated that other configurations are possible.

With further reference to the foregoing figures, third party discount and coupon services may be integrated into the user interface of the present invention, in relation to, but not limited to, the display of data objects that represent events, activities, medical resources, community resources, and/or the like. Example services may be Certifikid, Living Social, Groupon, or any like discount or coupon service. The user interface may display to the user available discounts or coupons for use in connection with events, activities, medical resources, and/or community resources. The user interface may display this information by embedded text, audio, pop-up, modal, alt text, overlay, panel, and/or any like element. It will be appreciated that other configurations are possible.

Although the invention has been described in detail for the purpose of illustration based on what is currently considered to be the most practical and preferred and non-limiting embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for collecting, storing, and presenting community information, comprising:
   storing in at least one database, for each user of a plurality of users, user data representative of at least one of the following: a user preference, a user interest, personal identifying information, or any combination thereof;
   retrieving resource data representative of at least one of the following: an event, an activity, a medical resource, a community resource, or any combination thereof;
   generating at least one data object comprising at least a portion of the resource data, each data object of the at least one data object representative of one of: an event, an activity, a medical resource, or a community resource;
   storing the at least one data object in the at least one database, the at least one database programmed or configured to store the at least one data object in association with at least one user of the plurality of users and at least one keyword representative of at least one of a user preference and a user interest;
   generating at least one search parameter based at least partially on the user data;
   retrieving the at least one data object from the at least one database based at least partially on the at least one search parameter; and
   generating a graphical representation of at least one card, wherein each card of the at least one card is a modular, geometric field displaying at least partial data from a data object, the graphical representation based at least partially on at least one of the following: the user data, the at least one keyword, the at least one search parameter, or any combination thereof; and
   wherein each card of the at least one card is representative of a data object of the at least one data object, and each card comprises at least one of the following attributes: a title, a date, a time, a cost, a rating, a description, a location, or any combination thereof.

2. The method of claim 1, further comprising retrieving resource data by automatically searching and storing data from at least one of the following: community events websites, blogs, business websites, professional services databases, public calendars, or any combination thereof.

3. The method of claim 1, further comprising:
   generating an electronic correspondence based at least partially on the user data of the at least one user, the electronic correspondence comprising at least a portion of the resource data of the at least one data object; and
   communicating the electronic correspondence to the at least one user.

4. A computer-implemented method for collecting, storing, and presenting community information, comprising:
   storing in at least one database, for each user of a plurality of users, user data representative of at least one of the following: a user preference, a user interest, personal identifying information, or any combination thereof;
   storing in the at least one database, for each user of the plurality of users, a user profile configured to be associated with at least one child profile, the at least one child profile comprising at least one of the following attributes: an age, a gender, an interest, or any combination thereof;
   retrieving resource data representative of at least one of the following: an event, an activity, a medical resource, a community resource, or any combination thereof;
   generating at least one data object comprising at least a portion of the resource data, each data object of the at least one data object representative of one of: an event, an activity, a medical resource, and a community resource;
   storing the at least one data object in the at least one database, the at least one database programmed or configured to store the at least one data object in association with at least one user of the plurality of users and at least one keyword representative of at least one of a user preference and a user interest;
   generating at least one search parameter based at least partially on the user data;
   retrieving the at least one data object from the at least one database based at least partially on the at least one search parameter; and
   generating a graphical representation of the at least one data object based at least partially on at least one of the following: the user data, the at least one keyword, the at least one search parameter, or any combination thereof.

5. The method of claim 4, wherein the at least one search parameter is based at least partially on input by a first user, the input comprising at least one of the following: a search term, a resource type, a resource subtype, a specialty, a date, a time, a location, or any combination thereof.

6. The method of claim 5, further comprising, in response to receiving the input by the first user, generating the graphical representation as a plurality of cards representative of a plurality of data objects, the plurality of cards being organized at least partially by relevance to the input, and each card of the plurality of cards displaying at least one of the following attributes: a title, a date, a time, a cost, a rating, a description, a location, or any combination thereof.

7. The method of claim 6, wherein the plurality of cards is organized at least partially by relevance to at least one attribute of the at least one child profile associated with the user profile of the first user.

8. The method of claim 6, wherein the plurality of cards is organized at least partially by proximity to a location attribute of the user profile of the first user.

9. The method of claim 4, further comprising:
   generating an electronic correspondence based at least partially on at least one attribute of at least one child profile, the electronic correspondence comprising at least a portion of the resource data of the at least one data object; and
   communicating the electronic correspondence to the at least one user.

10. The method of claim 4, wherein the at least one database is programmed or configured to associate at least one plurality of data objects with the at least one user, the at least one plurality of data objects grouped by user designation.

11. A computer-implemented method for collecting, storing, and presenting community information, comprising:
    storing in at least one database, for each user of a plurality of users, user data representative of at least one of the following: a user preference, a user interest, personal identifying information, or any combination thereof;
    retrieving resource data representative of at least one of the following: an event, an activity, a medical resource, a community resource, or any combination thereof;
    generating at least one data object comprising at least a portion of the resource data, each data object of the at least one data object representative of one of: an event, an activity, a medical resource, and a community resource;

storing the at least one data object in the at least one database, the at least one database programmed or configured to:

store the at least one data object in association with at least one user of the plurality of users;

store the at least one data object in association with at least one keyword representative of at least one of a user preference and a user interest; and facilitate a user query of the at least one database to retrieve the at least one data object;

generating at least one search parameter based at least partially on the user data;

retrieving the at least one data object from the at least one database based at least partially on the at least one search parameter; and generating a graphical representation of the at least one data object based at least partially on at least one of the following: the user data, the at least one keyword, the at least one search parameter, or any combination thereof.

12. The method of claim 11, further comprising retrieving resource data by automatically searching and storing data from at least one of the following: community events websites, blogs, business websites, professional services databases, public calendars, or any combination thereof.

13. The method of claim 11, wherein the at least one search parameter is based at least partially on input by a first user, the input comprising at least one of the following: a search term, a resource type, a resource subtype, a specialty, a date, a location, or any combination thereof.

14. The method of claim 13, further comprising, in response to receiving the input by the first user, generating the graphical representation as a plurality of cards representative of a plurality of data objects, wherein each card of the plurality of cards is a modular, geometric field displaying at least partial data from a data object, the plurality of cards being organized at least partially by relevance to the input, and each card of the plurality of cards displaying at least one of the following attributes: a time, a rating, a description, a location, or any combination thereof.

15. The method of claim 14, wherein the plurality of cards is organized at least partially by proximity to a location attribute of a user profile of the first user.

16. The method of claim 14, wherein the graphical representation comprises at least one suggested card of the plurality of cards having high relevance to the input, the at least one suggested card being designated as a top suggestion and being graphically represented as visually distinct from other cards.

17. The method of claim 11, further comprising associating the at least one data object with a time attribute representative of a current or future event, the time attribute comprising at least one of the following: a start time, an end time, a duration, or any combination thereof.

18. The method of claim 17, further comprising generating the graphical representation of the at least one data object based at least partially on the time attribute.

19. The method of claim 17, further comprising:

generating an electronic correspondence based at least partially on the user data of the at least one user, the electronic correspondence comprising at least a portion of the resource data of the at least one data object; and communicating the electronic correspondence to the at least one user, wherein communication of the electronic correspondence is conditioned on the time attribute.

20. The method of claim 11, wherein the at least one database is programmed or configured to associate at least one plurality of data objects with the at least one user, the at least one plurality of data objects grouped by user designation.

* * * * *